United States Patent
Takahashi

(10) Patent No.: US 8,411,289 B2
(45) Date of Patent: Apr. 2, 2013

(54) OPTICAL POSITION DETECTION DEVICE

(75) Inventor: Masaki Takahashi, Suwa (JP)

(73) Assignee: Seiko Epson Corporation (JP)

( * ) Notice: Subject to any disclaimer, the term of this patent is extended or adjusted under 35 U.S.C. 154(b) by 300 days.

(21) Appl. No.: 12/968,435

(22) Filed: Dec. 15, 2010

(65) Prior Publication Data

US 2011/0222075 A1 Sep. 15, 2011

(30) Foreign Application Priority Data

Mar. 10, 2010 (JP) ................. 2010-052818

(51) Int. Cl.
*G01B 11/14* (2006.01)

(52) U.S. Cl. ........................................ 356/623

(58) Field of Classification Search .......... 356/623, 356/614

See application file for complete search history.

(56) References Cited

U.S. PATENT DOCUMENTS

| 6,953,926 | B2 | 10/2005 | Reime | |
|---|---|---|---|---|
| 7,342,670 | B2 * | 3/2008 | Teichman | 356/614 |
| 7,804,604 | B2 * | 9/2010 | Teichman | 356/614 |
| 2009/0295744 | A1 | 12/2009 | Onishi | |
| 2010/0020334 | A1 | 1/2010 | Nakanishi | |
| 2011/0096322 | A1 * | 4/2011 | Nakanishi | 356/51 |

FOREIGN PATENT DOCUMENTS

JP 2003-534554 11/2003

* cited by examiner

*Primary Examiner* — Roy M Punnoose

(74) *Attorney, Agent, or Firm* — Harness, Dickey & Pierce, P.L.C.

(57) ABSTRACT

An optical position detection device, includes: a light source adapted to emit at least one detection light beam toward one side in a Z-axis direction; a first detector having a light receiving section directed to the one side in the Z-axis direction; a second detector located at a position on the one side in the Z-axis direction, the position being distant from the light source and the first detector, and having a light receiving section directed to the one side in the Z-axis direction; and a position derivation section adapted to derive a position of a object located in a first space between the first detector and the second detector and a position of a object located in a second space on the one side of the second detector in the Z-axis direction based on a light receiving result in the first detector and the second detector.

9 Claims, 8 Drawing Sheets

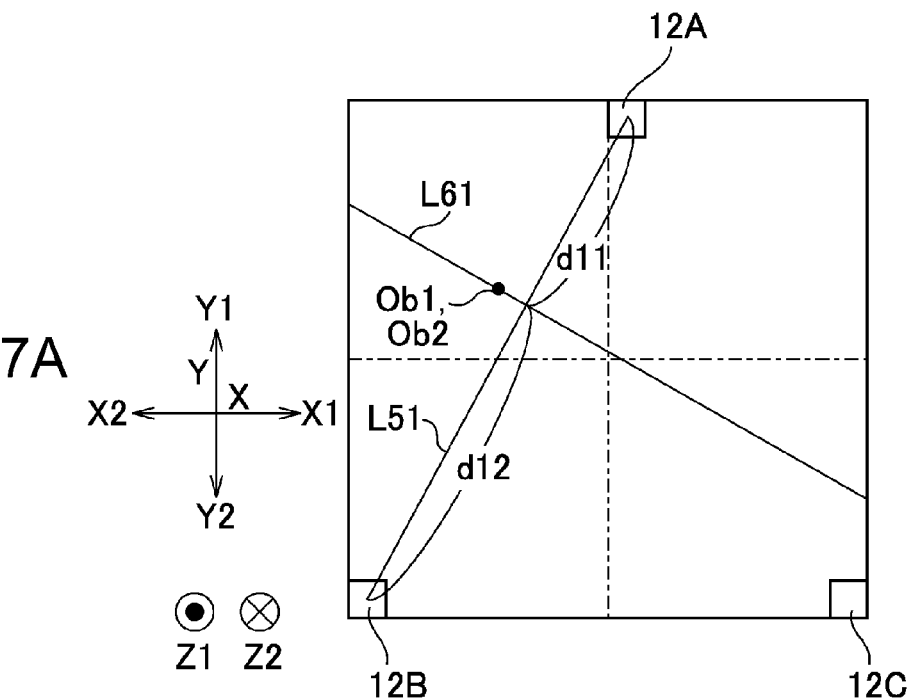
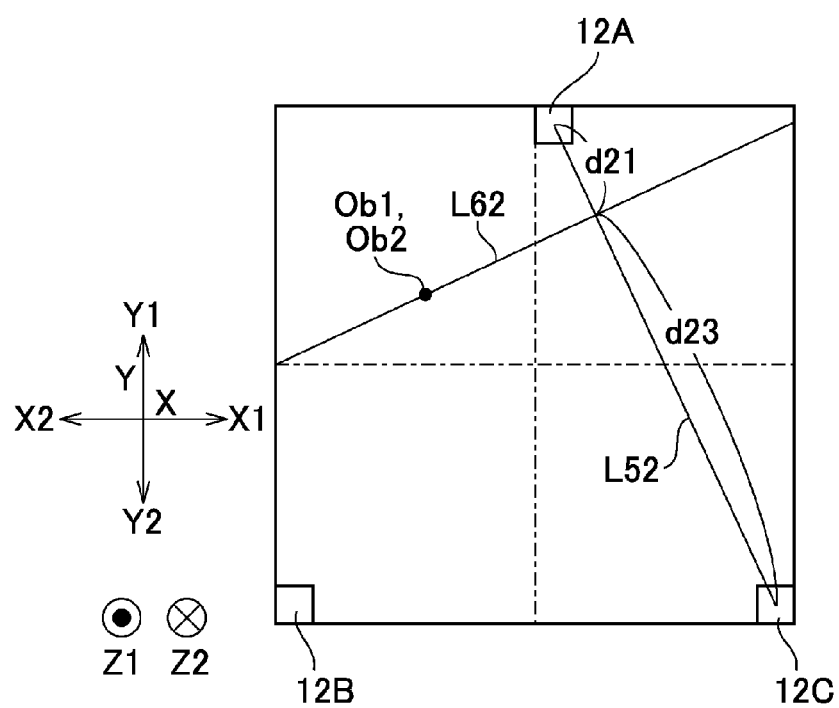

OPTICAL POSITION DETECTION DEVICE

BACKGROUND

1. Technical Field

The present invention relates to an optical position detection device for optically detecting the position of a target object.

2. Related Art

As an optical position detection device for optically detecting the position of a target object, there is proposed a technology of emitting a detection light to the target object located on a first surface of a transmissive plate (light propagation medium) from a second surface thereof opposite to the first surface, and detecting the detection light, which is reflected by the target object and transmitted through the transmissive plate to the second surface thereof, with a light detector (see JP-T-2003-534554 (Document 1; the term "JP-T" as used herein means a published Japanese translation of a PCT patent application).

Here, the inventors study the optical position detection device for optically detecting the positions of target objects respectively located in two spaces such as the positions of a customer (a target object) located inside a store window and a customer (a target object) located outside the store window, or the positions of a game medium (a target object) located inside a cover glass of an amusement device and a player (a target object) located outside the cover glass thereof. However, in the technology described in Document 1, since the detection result in the light detector is obtained as a sum of intensities of the detection light beams reflected by the respective target objects located in the two spaces, there arises a problem that detection of the respective positions of the target objects located in the two spaces is not achievable.

SUMMARY

An advantage of some aspects of the invention is to provide an optical position detection device capable of detecting the respective positions of the target objects located in two spaces.

According to an aspect of the invention, there is provided an optical position detection device adapted to optically detect a position of a target object, including a position detecting light source adapted to emit at least one detection light beam toward one side in a Z-axis direction intersecting an X-axis direction and a Y-axis direction intersecting each other, a first light detector having a light receiving section directed to the one side in the Z-axis direction, a second light detector located at a position on the one side in the Z-axis direction, the position being distant from the position detecting light source and the first light detector, and having a light receiving section directed to the one side in the Z-axis direction, and a position derivation section adapted to derive a position of a target object located in a first space between the first light detector and the second light detector and a position of a target object located in a second space on the one side of the second light detector in the Z-axis direction based on a light receiving result in the first light detector and a light receiving result in the second light detector.

In this aspect of the invention, the position detecting light source is disposed so as to be directed toward the one side in the Z-axis direction, and the first light detector and the second light detector with the light receiving sections directed toward the one side in the Z-axis direction are disposed at positions distant from each other in the Z-axis direction. Therefore, when the position detecting light source emits the detection light beam toward the one side in the Z-axis direction, the detection light beam reflected by the target object located in the first space between the first light detector and the second light detector is received by the first light detector, and the detection light beam reflected by the target object located in the second space on the one side of the second light detector in the Z-axis direction is received by the first light detector and the second light detector. Therefore, by performing the correction corresponding to the light receiving result in the second light detector on the light receiving result in the first light detector, for example, subtracting the light receiving result in the second light detector from the light receiving result in the first light detector, the intensity of the detection light beam reflected by the target object located in the first space can be obtained, and by using the calculation result of the intensity, the position of the target object located in the first space can be derived. Further, the position of the target object located in the second space can be derived based on the light receiving result in the second light detector. Therefore, the positions of the target objects respectively located in the two spaces (the first space and the second space) distant from each other in the emission direction of the detection light beam can be detected optically.

In this aspect of the invention, it is possible to adopt the configuration in which the position derivation section derives the position of the target object located in the second space based on the light receiving result in the second light detector, and detects the position of the target object located in the first space based on a difference between the light receiving result in the first light detector and the light receiving result in the second light detector. According to the configuration of this aspect of the invention, it is possible to perform the correction corresponding to the light receiving result in the second light detector on the light receiving result in the first light detector by a simple process of obtaining the difference.

In this aspect of the invention, it is possible to adopt the configuration in which the position derivation section derives a position in the X-axis direction and a position in the Y-axis direction as the position of the target object.

In this aspect of the invention, it is possible to adopt the configuration in which the position derivation section derives a position in the Z-axis direction as the position of the target object.

In this aspect of the invention, it is preferable to provide a transmissive member located on the one side of the position detecting light source and the first light detector in the Z-axis direction, and adapted to hold the second light detector. According to the configuration of this aspect of the invention, the second light detector can be disposed at a position distant from the position detecting light source and the first light detector on the one side in the Z-axis direction. Further, the transmissive member has an advantage that the presence thereof is inconspicuous.

In this aspect of the invention, it is possible to adopt the configuration in which the transmissive member has a plate-like shape, and the first space and the second space are separated by the transmissive member. According to the configuration of this aspect of the invention, it is possible to use the optical position detection device to which the invention is applied to optically detect the position of a customer (the target object) located inside a store window (the transmissive member) and the position of a customer (the target object) located outside. Further, it is possible to use the optical position detection device to which the invention is applied to optically detect the position of a game medium (the target object) located inside a cover glass (the transmissive member) in amusement equipment covered by the cover glass and the position of a player (the target object) located outside.

In this aspect of the invention, it is preferable that the second light detector is disposed on a side of the first space with respect to the transmissive member. Since the position detecting light source and the first light detector are disposed on the side of the first space with respect to the transmissive member, by disposing the second light detector on the side of the first space with respect to the transmissive member, all of the position detecting light source, the first light detector, and the second light detector can be disposed on the side of the first space, and therefore, since there is no need to dispose any of the position detecting light source, the first light detector, and the second light detector, the configuration in the second space can be simplified.

In this aspect of the invention, it is preferable that the position detecting light source emits at least one infrared light beam as the detection light beam. According to the configuration of this aspect of the invention, there can be obtained an advantage that the position detection light beam is inconspicuous.

In this aspect of the invention, it is preferable that the position detecting light source has a plurality of light emitting elements having central optical axes located differently, and adapted to emit the respective detection light beams to the one side in the Z-axis direction. According to the configuration of this aspect of the invention, since the position detecting light source can be constituted with the light emitting elements such as LEDs, the configuration of the position detecting light source can be simplified.

BRIEF DESCRIPTION OF THE DRAWINGS

The invention will be described with reference to the accompanying drawings, wherein like numbers reference like elements.

FIGS. 7A and 7B are explanatory diagrams showing a method of deriving the XY coordinate of the target object in the optical position detection device to which the invention is applied.

DESCRIPTION OF EXEMPLARY EMBODIMENTS

Figure 1A:
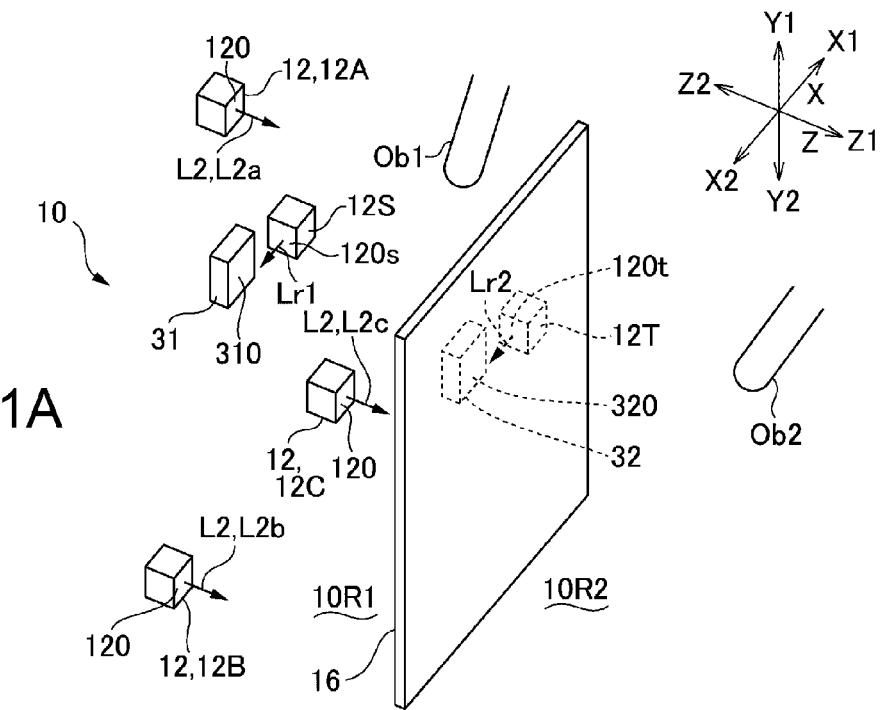
FIGS. 1A and 1B are explanatory diagrams schematically showing a substantial part of an optical position detection device to which the invention is applied.

An embodiment of the invention will be explained in detail with reference to the accompanying drawings. It should be noted that in the following explanation it is assumed that directions intersecting with each other are X-axis direction, Y-axis direction, and Z-axis direction, respectively. Further, in the drawings referred to below, things are shown assuming one side of the X-axis direction as an X1 side, the other side thereof as an X2 side, one side of the Y-axis direction as a Y1 side, the other side thereof as a Y2 side, one side of the Z-axis direction as a Z1 side, and the other side thereof as a Z2 side.

Overall Configuration of Optical Position Detection Device

Figure 1B:
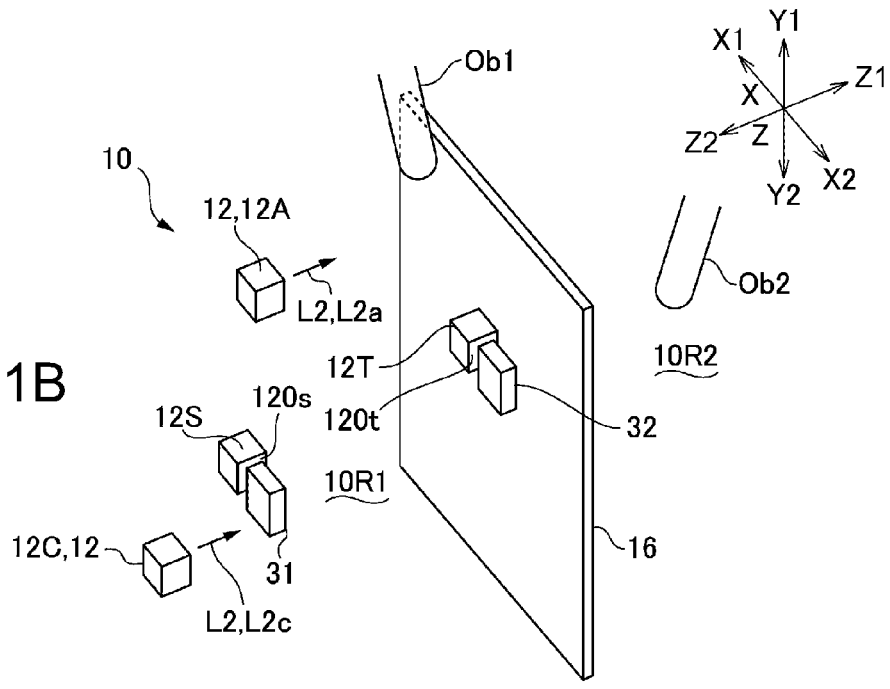
Figure 2:
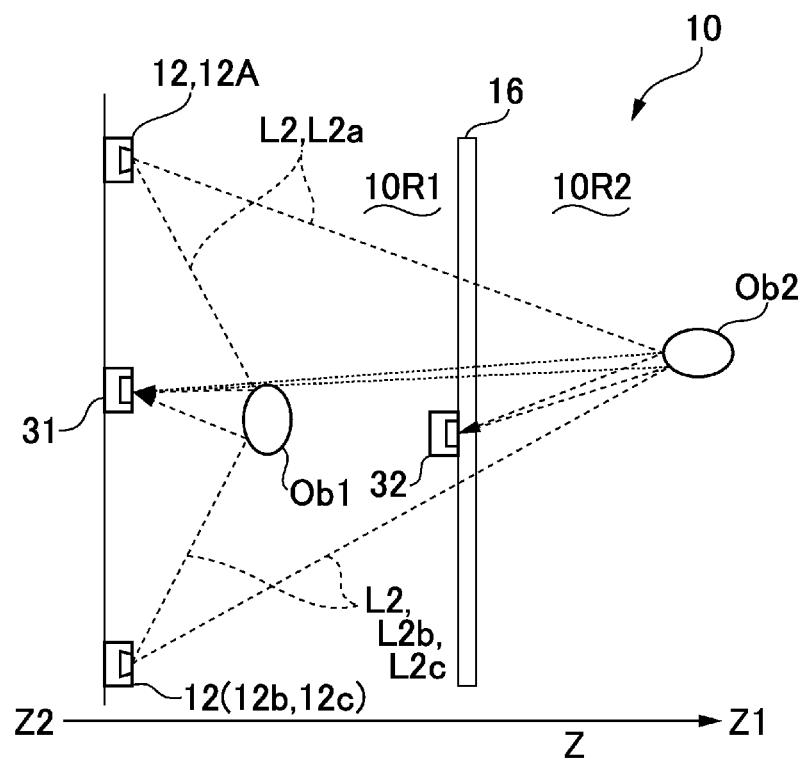
FIG. 2 is an explanatory diagram showing a positional relationship of detecting light sources and light detectors in the Z-axis direction in the optical position detection device to which the invention is applied.
Figure 3A:
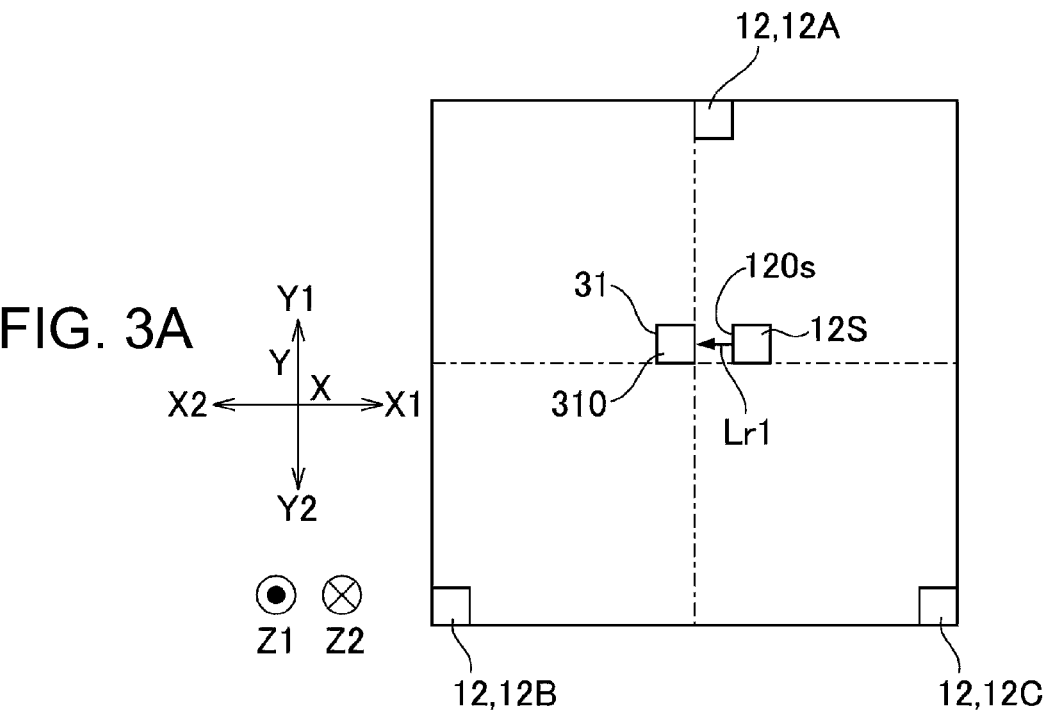
FIGS. 3A and 3B are explanatory diagrams showing the positions of the position detecting light sources and the light detectors in the X-axis direction and the Y-axis direction in the optical position detection device to which the invention is applied.
Figure 3B:
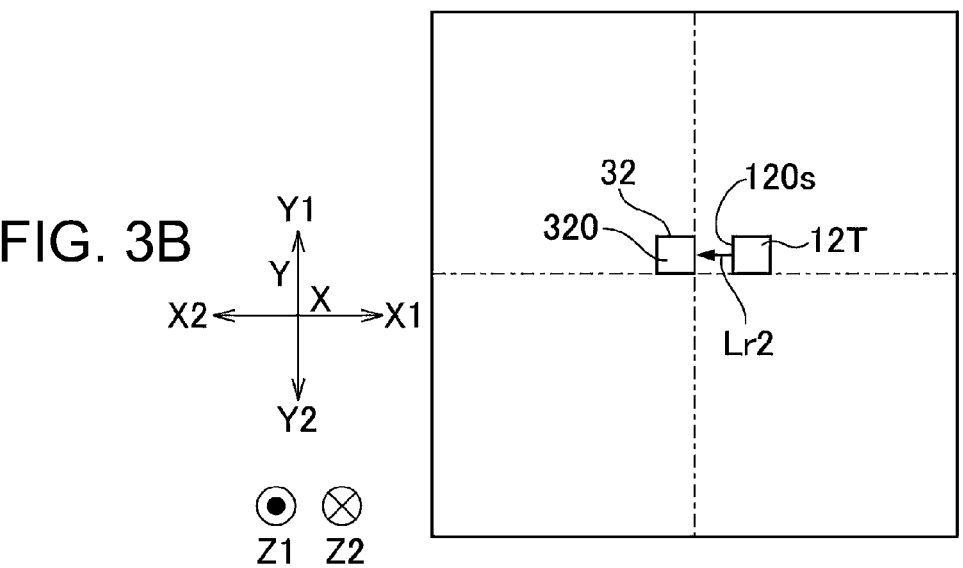

FIGS. 1A and 1B are explanatory diagrams schematically showing a substantial part of the optical position detection device to which the invention is applied, wherein FIG. 1A is an explanatory diagram of the light detector and so on of the position detection device viewed from the one side Z1 of the Z-axis direction, and FIG. 1B is an explanatory diagram of the light detector and so on thereof viewed from the other side Z2 of the Z-axis direction. FIG. 2 is an explanatory diagram showing a positional relationship of detecting light sources and light detectors in the Z-axis direction of the optical position detection device to which the invention is applied. FIGS. 3A and 3B are explanatory diagrams showing the positions of the position detecting light sources and the light detectors in the X-axis direction and the Y-axis direction in the optical position detection device to which the invention is applied, wherein FIG. 3A is an explanatory diagram showing the positions of a first light detector and so on disposed on the other side Z2 in the Z-axis direction, and FIG. 3B is an explanatory diagram showing the positions of a second light detector and so on disposed on the one side Z1 in the Z-axis direction. It should be noted that in FIGS. 1A, 1B, 3A, and 3B, the light emitting sections of the respective light emitting elements and the light receiving sections of the respective light receiving elements are indicated by gray areas.

As shown in FIGS. 1A, 1B, 2, 3A, and 3B, the optical position detection device 10 according to the present embodiment is a device for optically detecting the position of the target object, and is provided with the position detecting light source 12 for emitting the detection light beams L2 toward the one side Z1 in the Z-axis direction and the first light detector 31 having the light receiving section 310 directed toward the one side Z1 in the Z-axis direction.

In the present embodiment, the position detecting light source 12 is composed of a plurality of light emitting elements 12A, 12B, 12C each having the light emitting section 120 directed toward the one side Z1 in the Z-axis direction. The central optical axes of the respective light emitting elements 12A, 12B, and 12C all extend in the Z-axis direction, and the light emitting elements 12A, 12B, and 12C respectively emit the detection light beams L2 (the detection light beams L2a, L2b, and L2c) toward the one side Z1 in the Z-axis direction. Here, the central optical axes of the light emitting elements 12A, 12B, and 12C are parallel to each other, but are located differently. More specifically, the central optical axis of the light emitting element 12B is located at a position shifted toward the other side X2 in the X-axis direction and the other side Y2 in the Y-axis direction from the central optical axis of the light emitting element 12A. Further, the central optical axis of the light emitting element 12C is located at a position shifted toward the one side X1 in the X-axis direction and the other side Y2 in the Y-axis direction from the central optical axis of the light emitting element 12A. It should be noted that the central optical axis of the light emitting element 12B and the central optical axis of the light emitting element 12C are shifted from each other in the X-axis direction, but are located at roughly the same positions in the Y-axis direction.

Such light emitting elements 12A, 12B, and 12C constituting the position detecting light source 12 are all light emitting diodes for emitting infrared light beams, and emit the detection light beams L2 each composed of an infrared light beam as diverging light beams. Since the detection light beams L2 each preferably have a wavelength range efficiently reflected by the target objects Ob1 and Ob2 such as a finger or a stylus pen, if the target objects Ob1 and Ob2 are human bodies such as fingers, infrared light beams (in particular near infrared light beams with a wavelength range near to the visible light range and having a peak wavelength of around 850 nm) having high reflectance on a surface of a human body are used as the detection light beams L2.

The first light detector 31 is formed of a device capable of detecting the infrared light beams such as a photodiode or a phototransistor, and in the present embodiment, a photodiode is used therefor. The first light detector 31 and the position detecting light source 12 (the light emitting elements 12A, 12B, and 12C) are located at positions roughly the same in the Z-axis direction.

On the lateral side of the first light detector 31, there is disposed a first reference light emitting element 12S with a light emitting section 120s directed toward the first light detector 31. Such a first reference light emitting element 12S is also formed of the light emitting diode for emitting an infrared light beam similarly to the position detecting light source 12 (the light emitting elements 12A, 12B, and 12C), and the light beam emitted from the first reference light emitting element 12S is used as a reference light beam Lr1.

In the optical position detection device 10 according to the present embodiment, at the position distant from the position detecting light source 12 and the first light detector 31 on the one side Z1 in the Z-axis direction, there is disposed a second light detector 32 with the light receiving section 320 directed toward the one side Z1 in the Z-axis direction. The first light detector 31 and the second light detector 32 are located at positions substantially overlapping with each other when viewed from the Z-axis direction. Similarly to the first light detector 31, the second light detector 32 is formed of a device capable of detecting the infrared light beams such as a photodiode or a phototransistor, and in the present embodiment, a photodiode is used therefor.

On the lateral side of the second light detector 32, there is disposed a second reference light emitting element 12T with a light emitting section 120t directed toward the second light detector 32. Such a second reference light emitting element 12T is also formed of the light emitting diode for emitting an infrared light beam similarly to the position detecting light source 12 (the light emitting elements 12A, 12B, and 12C) and the first reference light emitting element 12S, and the light beam emitted from the second reference light emitting element 12T is used as a reference light beam Lr2.

In the optical position detection device 10 thus configured, as described later, based on the light receiving result in the first light detector 31 and the light receiving result in the second light detector 32, the position of the target object Ob1 located in a first space 10R1 between the first light detector 31 and the second light detector 32 and the position of the target object Ob2 located in a second space 10R2 on the one side Z1 of the second light detector 32 in the Z-axis direction.

In the optical position detection device 10 according to the present embodiment, a transmissive member 16 is located at a position distant from the position detecting light source 12 and the first light detector 31 on the one side Z1 in the Z-axis direction. The transmissive member 16 is formed of a glass plate or a synthetic resin plate capable of transmitting an infrared light beam, and partitions the space located on the one side Z1 of the position detecting light source 12 and the first light detector 31 in the Z-axis direction into the first space 10R1 and the second space 10R2. The transmissive member 16 is provided with the second light detector 32 and the second reference light emitting element 12T mounted thereon, and at the same time, the transmissive member 16 is also provided with a wiring layer (not shown) for the second light detector 32 and the second reference light emitting element 12T. In the present embodiment, the second light detector 32 and the second reference light emitting element 12T are mounted on the side of the first space 10R1 out of the both surfaces of the transmissive member 16. It should be noted that the wiring layer is thin, and therefore never hinders the transmission of infrared light and visible light by the transmissive member 16. However, since the wiring layer is preferably inconspicuous, it is preferable that the wiring layer is formed of a transmissive conductive film such as an indium tin oxide (ITO) film or an indium zinc oxide (IZO) film.

Electrical Configuration of Optical Position Detection Device 10

Figure 4:
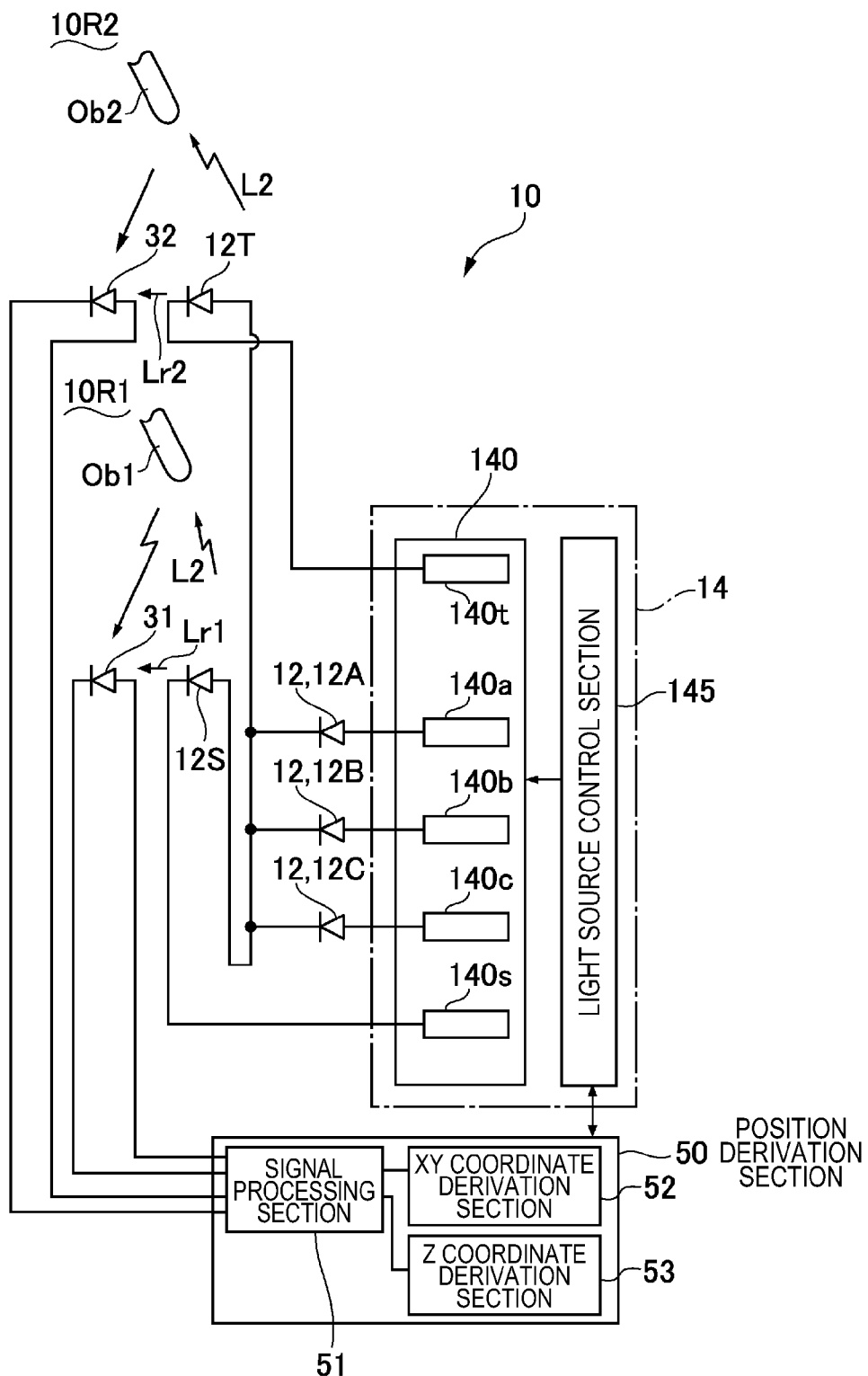
FIG. 4 is a block diagram showing an electrical configuration of the optical position detection device to which the invention is applied.

FIG. 4 is a block diagram showing an electrical configuration of the optical position detection device 10 to which the invention is applied. As shown in FIG. 4, the optical position detection device 10 includes a light source drive section 14 for driving the position detecting light source 12 (the light emitting elements 12A, 12B, and 12C), the first reference light emitting element 12S, and the second reference light emitting element 12T, and a position derivation section 50 to which the detection results are output from the first light detector 31 and the second light detector 32.

The light source drive section 14 is provided with a light source drive circuit 140 for driving the light emitting elements such as the light emitting elements 12A, 12B, and 12C, the first reference light emitting element 12S, and the second reference light emitting element 12T, and a light source control section 145 for controlling the emission intensity of each of the light emitting elements via the light source drive circuit 140. The light source drive circuit 140 is provided with a light source drive circuit 140a for driving the light emitting element 12A, a light source drive circuit 140b for driving the light emitting element 12B, and a light source drive circuit 140c for driving the light emitting element 12C. Further, the light source drive circuit 140 is also provided with a light source drive circuit 140s for driving the first reference light emitting element 12S and a light source drive circuit 140t for driving the second reference light emitting element 12T.

The position derivation section 50 is provided with a signal processing section 51, an XY coordinate derivation section 52, and a Z coordinate derivation section 53, and derives the position (the XY coordinate and the Z coordinate) of the target object Ob1 located in the first space 10R1 and the position (the XY coordinate and the Z coordinate) of the target object Ob2 located in the second space 10R2. The position derivation section 50 is constituted by, for example, a microprocessor unit (MPU), and thus, it is possible to adopt a configuration of performing a process in accordance with performing predetermined software (an operation program). Further, as the position derivation section 50, it is also possible to adopt a configuration of performing the process with a signal processing section 51 using hardware such as a logic circuit. It should be noted that the light source control section 145 and the position derivation section 50 are connected to each other with a signal line, and the drive of the light emitting elements and the detection operation in the position derivation section 50 are performed in conjunction with each other.

Configuration of Light Intensity Distribution of Position Detection Light Beams L2

Figure 5A:
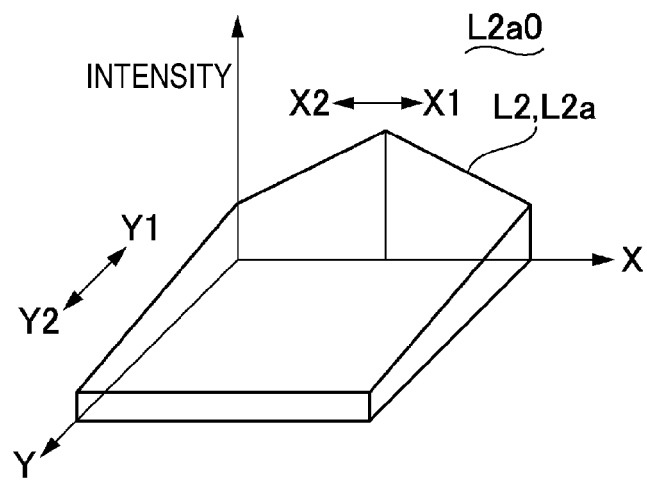
FIGS. 5A through 5C are explanatory diagrams of position detection light beams used in the optical position detection device to which the invention is applied.
Figure 5B:
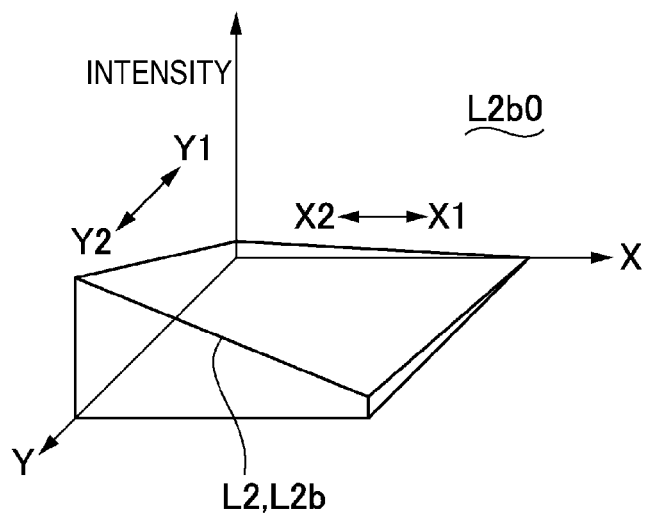
Figure 5C:
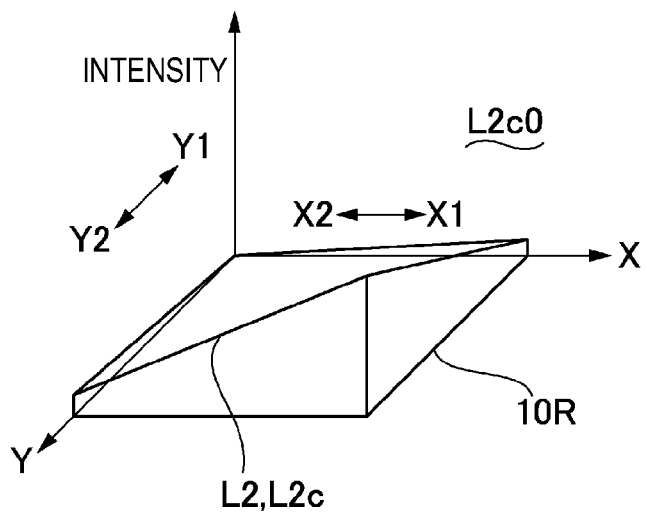

FIGS. 5A through 5C are explanatory diagrams of the position detection light beams used in the optical position detection device 10 to which the invention is applied, wherein FIG. 5A is an explanatory diagram of the light intensity distribution of the detection light beam L2a emitted by the light emitting element 12A, FIG. 5B is an explanatory diagram of the light intensity distribution of the detection light beam L2b emitted by the light emitting element 12B, and FIG. 5C is an explanatory diagram of the light intensity distribution of the detection light beam L2c emitted by the light emitting element 12C.

The light emitting elements 12A, 12B, and 12C explained with reference to FIGS. 1A, 1B, 2, 3A, and 3B have the respective central optical axes directed to positions different from each other. Further, the detection light beams L2a, L2b, and L2c are each a diverging light beam, and such a diverging light beam has the highest intensity around the central optical axis, and the intensity is lowered continuously as the distance from the central optical axis increases. Therefore, the detection light beam L2a emitted from the light emitting element 12A forms the light intensity distribution L2a0 shown in FIG. 5A. In such a light intensity distribution L2a0, the intensity becomes the highest at roughly the center in the X-axis direction on the one side Y1 in the Y-axis direction, and the intensity decreases monotonically as the distance from the highest intensity portion increases. In the light intensity distribution L2a0 according to the present embodiment, the intensity decreases linearly or substantially linearly as the distance from the highest intensity portion increases. The detection light beam L2b emitted from the light emitting element 12B forms the light intensity distribution L2b0 shown in FIG. 5B. In such a light intensity distribution L2b0, the intensity becomes the highest on the other side X2 in the X-axis direction on the other side Y2 in the Y-axis direction, and the intensity decreases monotonically as the distance from the highest intensity portion increases. In the light intensity distribution L2b0 according to the present embodiment, the intensity decreases linearly or substantially linearly as the distance from the highest intensity portion increases. The detection light beam L2c emitted from the light emitting element 12C forms the light intensity distribution L2c0 shown in FIG. 5C. In such a light intensity distribution L2c0, the intensity becomes the highest on the one side X1 in the X-axis direction on the other side Y2 in the Y-axis direction, and the intensity decreases monotonically as the distance from the highest intensity portion increases. In the light intensity distribution L2c0 according to the present embodiment, the intensity decreases linearly or substantially linearly as the distance from the highest intensity portion increases.

Here, the highest intensity portion of the light intensity distribution L2a0 and the highest intensity portion of the light intensity distribution L2b0 are shifted from each other in both of the X-axis direction and the Y-axis direction. Further, the highest intensity portion of the light intensity distribution L2a0 and the highest intensity portion of the light intensity distribution L2c0 are shifted from each other in both of the X-axis direction and the Y-axis direction. Further, the highest intensity portion of the light intensity distribution L2b0 and the highest intensity portion of the light intensity distribution L2c0 are shifted from each other in the X-axis direction. In other words, the highest intensity portion of the light intensity distribution L2a0, the highest intensity portion of the light intensity distribution L2b0, and the highest intensity portion of the light intensity distribution L2c0 are located at positions corresponding to the apexes of an imaginary triangle.

Fundamental Principle of Position Detection

In the optical position detection device 10 according to the present embodiment, as shown in FIG. 2, the position detection light beams L2 (the position detection light beams L2a through L2c) emitted from the position detecting light source 12 (the light emitting elements 12A, 12B, and 12C) are reflected by the target objects Ob1 and Ob2, and then some of the reflected light beams are detected by the first light detector 31 and the second light detector 32 to thereby detect the positions of the target objects Ob1, Ob2. On that occasion, the detection intensities in the first light detector 31 and the second light detector 32 have proportional relationships with the respective reflection intensities in the target objects Ob1, Ob2, and the reflection intensities in the target objects Ob1, Ob2 are proportional to the intensities of the detection light beams L2 (the detection light beams L2a, L2b, and L2c) at the respective places where the target objects Ob1, Ob2 are located. Therefore, the detection intensities in the first light detector 31 and the second light detector 32 are proportional to the intensities of the detection light beams L2 (the detection light beams L2a, L2b, and L2c) at the respective places where the target objects Ob1, Ob2 are located, as a result, in the light intensity distributions shown in FIGS. 5A through 5C.

Further, in the optical position detection device 10 according to the present embodiment, the position detecting light source 12 (the light emitting elements 12A, 12B, and 12C) is disposed so as to be directed toward the one side Z1 in the Z-axis direction, and the first light detector 31 and the second light detector 32 with the light receiving section directed toward the one side Z1 in the Z-axis direction are disposed at positions distant from each other on the one side Z1 in the Z-axis direction.

Therefore, in the case in which the target object Ob1 exists in the first space 10R1, the detection light beams L2 (the detection light beams L2a, L2b, and L2c) emitted from the respective position detecting light source 12 (the light emitting elements 12A, 12B, and 12C) are reflected by the target object Ob1, then the reflected light beams reach the first light detector 31, and the first light detector 31 detects the intensities of the reflected light beams.

Further, in the case in which the target object Ob2 exists in the second space 10R2, the detection light beams L2 (the detection light beams L2a, L2b, and L2c) emitted from the respective position detecting light source 12 (the light emitting elements 12A, 12B, and 12C) are reflected by the target object Ob2, then the reflected light beams reach the second light detector 32, and at the same time also reach the first light detector 31. Therefore, the intensities of the reflected light beams thus reflected by the target object Ob2 are detected by the first light detector 31, and at the same time also detected by the second light detector 32.

Therefore, in the case in which the target object Ob2 exists in the second space 10R2, the intensities of the reflected light beams reflected by the target object Ob2 can be obtained using the detection result in the second light detector 32 irrespective of whether or not the target object Ob1 exists in the first space 10R1. Therefore, the position derivation section 50 shown in FIG. 4 can detect the position (the XYZ coordinate) of the target object Ob2 using the method described later.

On the other hand, if the target object Ob2 does not exist in the second space 10R2 when detecting the position of the target object Ob1 in the first space 10R1, the intensities of the reflected light beams reflected by the target object Ob1 can be obtained from the detection result in the first light detector 31.

It should be noted that in the case in which the target object Ob2 exists in the second space 10R2, since the light beams reflected by the target object Ob2 also enter the first light detector 31 in addition to the light beams reflected by the target object Ob1, the intensities of the reflected light beams reflected by the target object Ob1 is unclear even by using the detection result in the first light detector 31. Therefore, in the present embodiment, the position derivation section 50 shown in FIG. 4 performs correction corresponding to the light receiving result in the second light detector 32 on the detection result of the first light detector 31 regardless of whether or not the target object Ob2 exists in the second space 10R2 to thereby obtain the intensities of the light beams reflected by the target object Ob1 located in the first space 10R1 when detecting the position of the target object Ob1 in the first space 10R1. More specifically, when detecting the position of the target object Ob1 in the first space 10R1, the position derivation section 50 subtracts the amount corresponding to the light receiving result in the second light detector 32 from the detection result of the first light detector 31, and obtains the intensities of the light beams reflected by the target object Ob1 located in the first space 10R1 based on the subtraction result (the difference between the detection result of the first light detector 31 and the light receiving result in the second light detector 32). Therefore, the position derivation section 50 shown in FIG. 4 can detect the position (the XYZ coordinate) of the target object Ob1 using the method described later.

Principle of XY Coordinate Detection

Figure 6A:
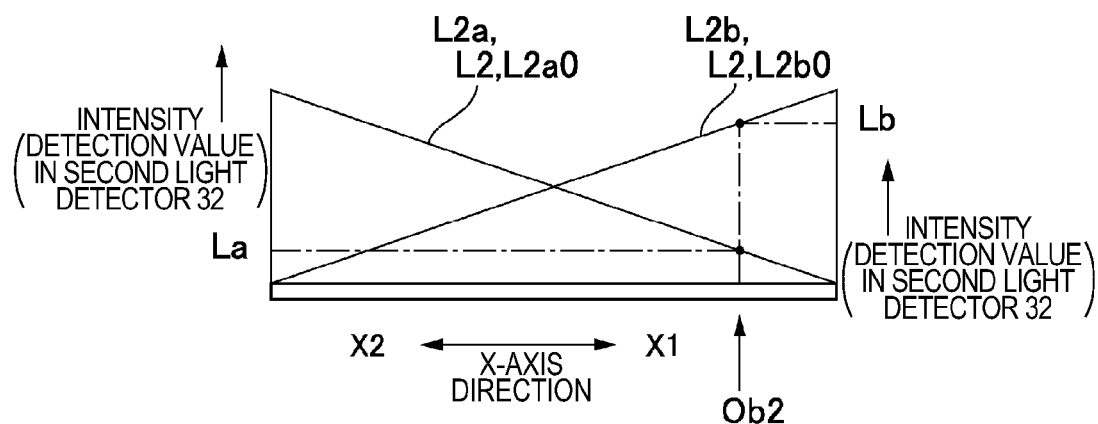
FIGS. 6A and 6B are explanatory diagrams showing the principle of XY coordinate detection used in the optical position detection device to which the invention is applied.
Figure 6B:
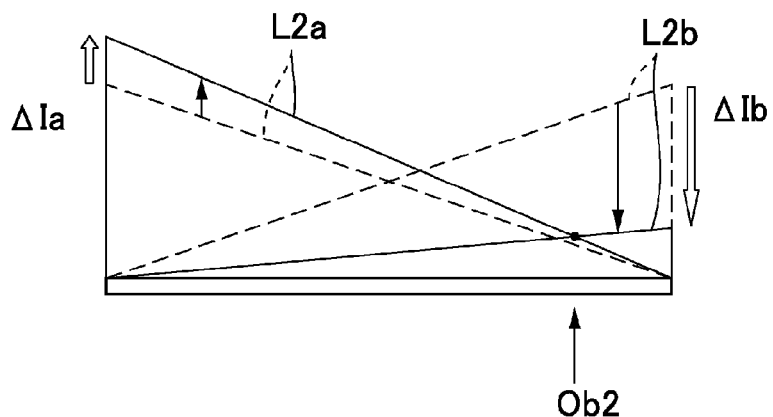

The principle of detection of the XY coordinate of the target object in the optical position detection device 10 to which the invention is applied will be explained with reference to FIGS. 6A, 6B, 7A, and 7B. FIGS. 6A and 6B are explanatory diagrams showing the principle of the XY coordinate detection used in the optical position detection device to which the invention is applied, wherein FIG. 6A is an explanatory diagram showing the light intensity distributions of the detection light beams, and FIG. 6B is an explanatory diagram showing how the light intensity distributions of the detection light beams are adjusted so that the intensities of the detection light beams reflected by the target object Ob2 become equal to each other. FIGS. 7A and 7B are explanatory diagrams showing a method of deriving the XY coordinate of the target object in the optical position detection device 10 to which the invention is applied.

First Example of Principle of XY Coordinate Detection

In the optical position detection device 10 according to the present embodiment, as explained hereinabove with reference to FIGS. 1A, 1B, 2, 3A, 3B, 4, and 5A through 5C, the position detecting light source 12 (the light emitting elements 12A, 12B, and 12C) is provided with the highest intensity portions at the apexes of the imaginary triangle in the XY plane, and the light emitting elements have the respective light intensity distributions different from each other. Therefore, in the present embodiment, firstly, the light emitting elements 12A, 12B, and 12C are lit sequentially at different timings, and in the meantime, the first light detector 31 and the second light detector 32 detect the intensities of the light beams input. Further, the detection results in the first light detector 31 and the second light detector 32 when lighting the light emitting element 12A, the detection results in the first light detector 31 and the second light detector 32 when lighting the light emitting element 12B, the detection results in the first light detector 31 and the second light detector 32 when lighting the light emitting element 12C are compared, and the positions of the target objects Ob1, Ob2 are detected based on the comparison result.

Hereinafter, an example of detecting the XY coordinate of the target object Ob2 in the second space 10R2 will be explained in detail. Firstly, in a first XY coordinate detecting period, when lighting the light emitting element 12A while putting off the light emitting elements 12B, 12C, the light intensity distribution L2a0 in which the intensity decreases monotonically from the XY coordinate position of the light emitting element 12A to the XY coordinate position of the light emitting element 12B is formed between the XY coordinate position of the light emitting element 12A and the XY coordinate position of the light emitting element 12B as shown in FIG. 6A. Therefore, the detection light beam L2a is reflected by the target object Ob2 in the second space 10R2, and some of the reflected light beam is detected by the second light detector 32.

Then, in a second XY coordinate detecting period, when lighting the light emitting element 12B while putting off the light emitting elements 12A, 12C, the light intensity distribution L2b0 in which the intensity decreases monotonically from the XY coordinate position of the light emitting element 12B to the XY coordinate position of the light emitting element 12A is formed between the XY coordinate position of the light emitting element 12A and the XY coordinate position of the light emitting element 12B. Therefore, the detection light beam L2b is reflected by the target object Ob2 in the second space 10R2, and some of the reflected light beam is detected by the second light detector 32.

Then, the ratio between the detection result in the second light detector 32 in the first XY coordinate detecting period during which the light emitting element 12A is lit alone and the detection result in the second light detector 32 in the second XY coordinate detecting period during which the light emitting element 12B is lit alone is obtained, and if the ratio is equal to d11:d12, it is understood that on the XY plane shown in FIG. 7A the target object Ob2 is located on an imaginary line L61 (a first straight line) passing through the position, at which an imaginary straight line L51 connecting the XY coordinate position of the light emitting element 12A and the XY coordinate position of the light emitting element 12B is divided in the ratio of d11:d12, and extending in a direction perpendicular to the straight line L51.

Similarly, in the third XY coordinate detecting period, the light emitting element 12C is lit while putting off the light emitting elements 12A, 12B. As a result, the detection light beam L2c is reflected by the target object Ob2 in the second space 10R2, and some of the reflected light beam is detected by the second light detector 32. Therefore, the ratio between the detection result in the second light detector 32 in the first XY coordinate detecting period during which the light emitting element 12A is lit alone and the detection result in the second light detector 32 in the third XY coordinate detecting period during which the light emitting element 12C is lit alone is obtained, and if the ratio is equal to d21:d23, it is understood that on the XY plane shown in FIG. 7B the target object Ob2 is located on an imaginary line L62 (a second straight line) passing through the position, at which an imaginary straight line L52 connecting the XY coordinate position of the light emitting element 12A and the XY coordinate position of the light emitting element 12C is divided in the ratio of d21:d23, and extending in a direction perpendicular to the straight line L52.

Therefore, by obtaining the intersection point (the intersection point of the first straight line and the second straight line) of the two lines L61, L62 in the XY coordinate derivation section 52 shown in FIG. 4, the XY coordinate of the target object Ob2 can be detected. Further, by using the value obtained by subtracting the detection result in the second light detector 32 from the detection result in the first light detector 31 instead of the detection result in the second light detector 32, it is possible to detect the XY coordinate of the target object Ob1 in the XY coordinate derivation section 52 using the same method as in the case of the target object Ob2. More specifically, if the ratio between the value obtained by subtracting the detection result in the second light detector 32 from the detection result in the first light detector 31 when lighting the light emitting element 12A alone and the value obtained by subtracting the detection result in the second light detector 32 from the detection result in the first light detector 31 when lighting the light emitting element 12B alone is known, it is possible to obtain the line L61 (the first straight line; see FIG. 7A) on which the target object Ob1 is located. Further, if the ratio between the value obtained by subtracting the detection result in the second light detector 32 from the detection result in the first light detector 31 when lighting the light emitting element 12A alone and the value obtained by subtracting the detection result in the second light detector 32 from the detection result in the first light detector 31 when lighting the light emitting element 12C alone is known, it is possible to obtain the line L62 (the second straight line; see FIG. 7B) on which the target object Ob1 is located. Therefore, by obtaining the intersection point of the first straight line and the second straight line, the XY coordinate of the target object Ob1 can be detected.

Second Example of Principle of XY Coordinate Detection

Although in the fundamental principle 1 described above the detection result in the first light detector 31 and the detection result in the second light detector 32 are used directly for derivation of the position detection, it is also possible to detect the XY coordinates of the target objects Ob1, Ob2 using the differential between the light emitting element 12A and the light emitting element 12B, and the differential between the light emitting element 12A and the light emitting element 12C.

Hereinafter, an example of detecting the XY coordinate of the target object Ob2 in the second space 10R2 will be explained in detail. Firstly, the light emitting element 12A and the light emitting element 12B are lit alternately in a standard condition while keeping the light emitting element 12C in an off state. Then, the line L61 (the first straight line) explained with reference to FIG. 7A is obtained based on the current value (a controlled variable) and an adjustment value of the current value (the controlled variable) in the case of controlling the light emitting elements 12A, 12B so that the detection result in the second light detector 32 becomes the same between the first XY coordinate detecting period in which the light emitting element 12A is lit alone and the second XY coordinate detecting period in which the light emitting element 12B is lit alone. In such a method, the light emitting element 12A and the light emitting element 12C are lit alternately in a standard condition while keeping the light emitting element 12B in an off state, and the line L62 (the second straight line) explained with reference to FIG. 7B is obtained based on the current value (the controlled variable) and an adjustment value of the current value (the controlled variable) in the case of controlling the light emitting elements 12A, 12C so that the detection result in the second light detector 32 becomes the same between the third XY coordinate detecting period in which the light emitting element 12A is lit alone and the fourth XY coordinate detecting period in which the light emitting element 12C is lit alone, as a result.

More specifically, firstly, when lighting the light emitting elements 12A, 12B alternately while keeping the light emitting element 12C in an off state, the light intensity distribution L2a0 shown in FIG. 6A and the light intensity distribution L2b0 shown in FIG. 6A are formed alternately. Here, if the detection result La in the second light detector 32 in the first XY coordinate detecting period and the detection result Lb in the second light detector 32 in the second XY coordinate detecting period are equal to each other, it becomes that the target object Ob2 is located in the middle of the XY coordinate position of the light emitting element 12A and the XY coordinate position of the light emitting element 12B. In contrast, in the case in which the detection result La in the second light detector 32 in the first XY coordinate detecting period and the detection result Lb in the second light detector 32 in the second XY coordinate detecting period are different from each other, the controlled variables (the drive currents) to the light emitting elements 12A, 12B are adjusted so that the detection results La, Lb become equal to each other as shown in FIG. 6B. Then, by obtaining the ratio between the adjustment value ΔIa of the controlled variable to the light emitting element 12A in the first XY coordinate detecting period and the adjustment value ΔIb of the controlled variable to the light emitting element 12B in the second XY coordinate detecting period, the ratio (d11:d12) explained with reference to FIG. 7A can be obtained.

Further, by performing the method substantially the same as described above with the light emitting elements 12A, 12C lit alternately while keeping the light emitting element 12B in the off state, the ratio (d21:d23) explained with reference to FIG. 7B can be obtained.

Therefore, as is explained with reference to FIGS. 6A and 6B, the XY coordinate of the target object Ob2 can be detected. Further, by using the value obtained by subtracting the detection result in the second light detector 32 from the detection result in the first light detector 31 instead of the detection result in the second light detector 32, the XY coordinate of the target object Ob1 can be detected. Further, according to such a method, it is possible to cancel the influence of a disturbance such as the outside light or the temperature.

Fundamental Principle of Z Coordinate Detection

In the optical position detection device 10 according to the present embodiment, by lighting all of the plurality of light emitting elements (the light emitting elements 12A, 12B, and 12C), the light intensity distribution for Z coordinate detection obtained by combining the light intensity distributions explained with reference to FIGS. 5A through 5C is formed, and in such a light intensity distribution for the Z coordinate detection, the intensity changes monotonically in the Z-axis direction, as a result. For example, in the light intensity distribution for the Z coordinate detection, the intensity decreases linearly or substantially linearly toward the one side Z1 in the Z-axis direction. Therefore, the Z coordinate derivation section 53 shown in FIG. 4 can detect the Z coordinates of the target objects Ob1, Ob2 based on the detection results in the first light detector 31 and the second light detector 32 when lighting all of the light emitting elements 12A, 12B, and 21C. More specifically, the Z coordinate of the target object Ob2 can be detected based on the detection result in the second light detector 32 when lighting all of the light emitting elements 12A, 12B, and 12C. Further, by subtracting the detection result in the second light detector 32 from the detection result in the first light detector 31 when lighting all of the light emitting elements 12A, 12B, and 12C, the Z coordinate of the target object Ob1 can be detected.

Coordinate Detection Using Reference Light Beams

The optical position detection device 10 according to the present embodiment is provided with the first reference light emitting element 12S having the light emitting section 120s directed toward the first light detector 31, and the second reference light emitting element 12T having the light emitting section 120t directed toward the second light detector 32, and the reference light beams Lr1, Lr2 emitted respectively from the first reference light emitting element 12S and the second reference light emitting element 12T enter the first light detector 31 and the second light detector 32, respectively, with a constant intensity regardless of whether or not the target objects Ob1, Ob2 exist. Therefore, by using the comparison result between the detection light beams L2 (the detection light beams L2a through L2c) emitted from the position detecting light source 12 (the light emitting elements 12A, 12B, and 12C) and the reference light beams Lr1, Lr2 emitted from the first reference light emitting element 12S and the second reference light emitting element 12T, it is possible to cancel the influence of the disturbance such as the outside light or the temperature.

For example, the value obtained by subtracting the detection result in the first light detector 31 when putting off the light emitting elements 12A, 12B, and 12C and lighting the first reference light emitting element 12S from the detection result in the first light detector 31 when lighting the light emitting elements 12A, 12B, and 12C and putting off the first reference light emitting element 12S is set as a value with disturbance correction in the first light detector 31. Further, the value obtained by subtracting the detection result in the second light detector 32 when putting off the light emitting elements 12A, 12B, and 12C and lighting the second reference light emitting element 12T from the detection result in the second light detector 32 when lighting the light emitting elements 12A, 12B, and 12C and putting off the second reference light emitting element 12T is set as a value with disturbance correction in the second light detector 32. By using such values, it is possible to cancel the influence of the disturbance such as the outside light or the temperature.

Further, it is also possible to detect the coordinates of the target objects Ob1, Ob2 using the differential between the position detecting light source 12 (the light emitting elements 12A, 12B, and 12C) and the first reference light emitting element 12S, and the differential between the position detecting light source 12 (the light emitting elements 12A, 12B, and 12C) and the second reference light emitting element 12T.

Hereinafter, an example of detecting the Z coordinate of the target object Ob2 using the differential between the position detecting light source 12 (the light emitting elements 12A, 12B, and 12C) and the first reference light emitting element 12S, and the differential between the position detecting light source 12 (the light emitting elements 12A, 12B, and 12C) and the second reference light emitting element 12T will be explained with reference to FIGS. 8A and 8B.

Figure 8A:
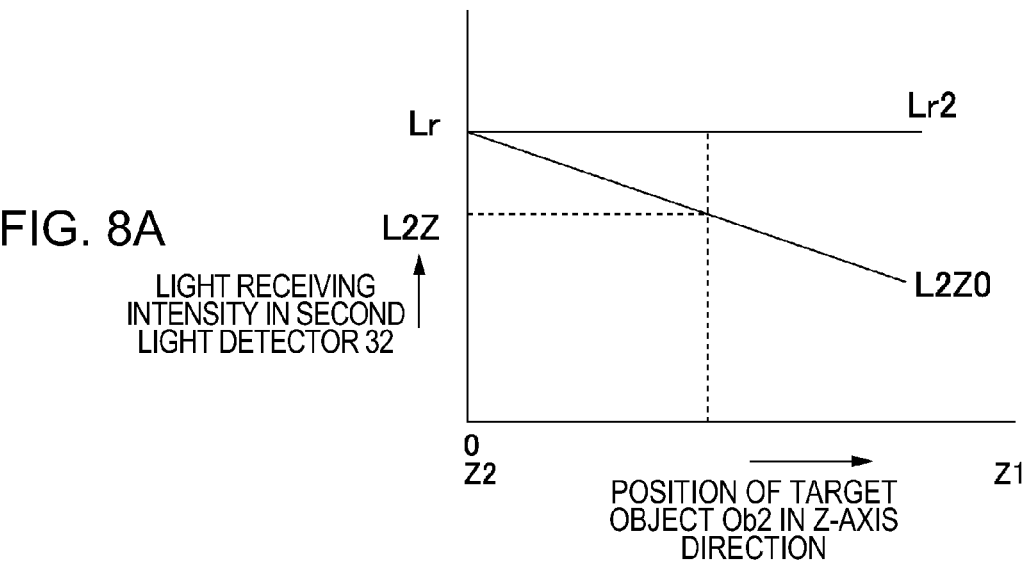
FIGS. 8A and 8B are explanatory diagrams showing the principle of detection of the coordinate of the target object using the differential in the optical position detection device to which the invention is applied.
Figure 8B:
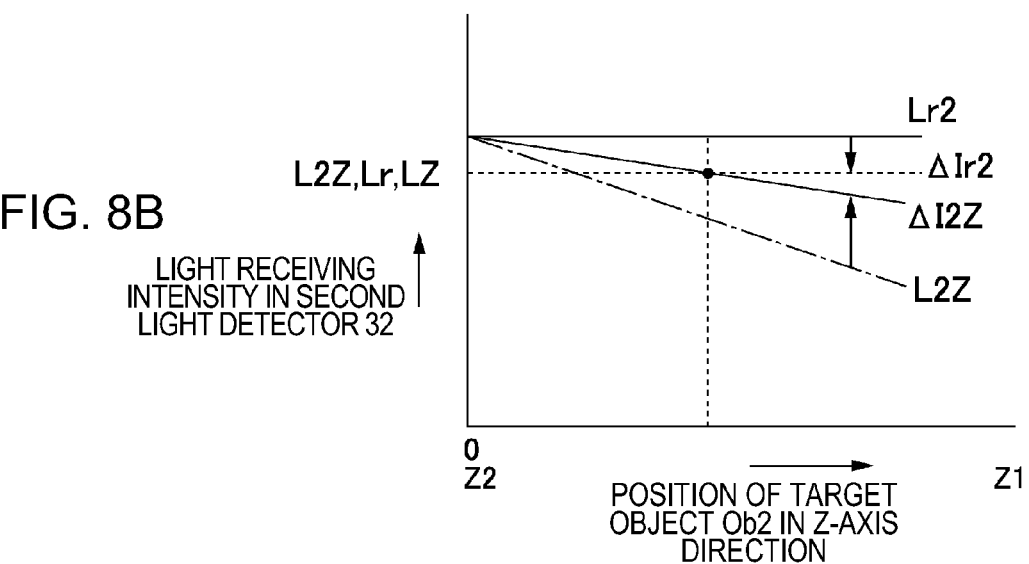

FIGS. 8A and 8B are explanatory diagrams showing the principle of detecting the coordinate of the target object Ob2 using the differential in the optical position detection device 10 to which the invention is applied, wherein FIG. 8A is an explanatory diagram showing the light intensity distribution of the detection light beam in the Z-axis direction, and FIG. 8B is an explanatory diagram showing the light intensity distribution of the detection light beam in the Z-axis direction adjusted so that the intensities of the detection light beams reflected by the target object Ob2 become equal to each other.

In the optical position detection device 10 according to the present embodiment, when lighting all of the light emitting elements 12A, 12B, and 12C in the standard condition in the detection light beam detection period, the light intensity distribution L2z0 in which the intensity decreases monotonically toward the one side Z1 in the Z-axis direction is formed as shown in FIG. 8A. Therefore, when the target object Ob2 is disposed in the second space 10R2, the detection light beams L2 are reflected by the target object Ob2, and some of the reflected light beams is detected by the second light detector 32. Here, the light receiving result L2z of the detection light beams L2 in the second light detector 32 has a certain relationship, for example, a proportional relationship, with the intensity corresponding to the position of the target object Ob2 in the light intensity distribution L2z0.

In contrast thereto, when putting off the light emitting elements 12A, 12B, and 12C while lighting the second reference light emitting element 12T in the reference light detection period, the reference light beam Lr2 emitted from the second reference light emitting element 12T is partially detected by the second light detector 32. Here, the reference light beam Lr2 is never reflected by the target object Ob2, the light receiving result Lr of the reference light beam Lr2 in the second light detector 32 is constant irrespective of the position of the target object Ob2.

Subsequently, the position derivation section 50 shown in FIG. 4 provides the light source control section 145 with an instruction to adjust the controlled variable (the drive current) to the light emitting elements 12A, 12B, and 12C and the controlled variable (the drive current) to the second reference light emitting element 12T so that the detection result L2z in the second light detector 32 in the detection light beam detection period and the detection result Lr in the second light detector 32 in the reference light beam detection period become equal to each other. As a result, as shown in FIG. 8B, if both of the detection result L2z in the second light detector 32 in the detection light beam detection period and the detection result Lr in the second light detector 32 in the reference light beam detection period take the same value Lz, the Z coordinate of the target object Ob2 can be detected based on the ratio and the difference between the adjustment value $\Delta I2z$ of the controlled variable with respect to the light emitting elements 12A, 12B, and 12C and the adjustment value $\Delta Ir2$ of the controlled variable with respect to the second reference light emitting element 12T.

Further, by using the value obtained by subtracting the detection result in the second light detector 32 from the detection result in the first light detector 31 instead of the detection result in the second light detector 32, the coordinate of the target object Ob1 in the first space 10R1 can be detected. According to such a method, it is possible to cancel the influence of the disturbance such as the outside light or the temperature.

It should be noted that the differential between the detection light beams L2 (the detection light beams L2a through L2c) emitted from the position detecting light source 12 (the light emitting elements 12A, 12B, and 12C) and the reference light beams Lr1, Lr2 emitted from the first reference light emitting element 12S and the second reference light emitting element 12T can be applied to the case of performing the method explained in the first example of the principle of the XY coordinate detection.

Further, although in the method described above, the intensities of the reference light beams Lr1, Lr2 emitted from the first reference light emitting element 12S and the second reference light emitting element 12T are varied, it is also possible that the intensities of the reference light beams Lr1, Lr2 emitted from the first reference light emitting element 12S and the second reference light emitting element 12T are fixed.

MAJOR ADVANTAGES OF PRESENT EMBODIMENT

As explained hereinabove, in the optical position detection device 10 according to the present embodiment, the position detecting light source 12 is disposed so as to be directed toward the one side Z1 in the Z-axis direction, and the first light detector 31 and the second light detector 32 with the light receiving sections 310, 320 directed toward the one side Z1 in the Z-axis direction are disposed at positions distant from each other in the Z-axis direction. Therefore, when the position detecting light source 12 emits the detection light beams toward the one side Z1 in the Z-axis direction, the detection light beams reflected by the target object Ob1 located in the first space 10R1 between the first light detector 31 and the second light detector 32 are received by the first light detector 31, and the detection light beams reflected by the target object Ob2 located in the second space 10R2 on the one side Z1 of the second light detector 32 in the Z-axis direction are received by the first light detector 31 and the second light detector 32.

Therefore, by performing the correction corresponding to the light receiving result in the second light detector 32 on the light receiving result in the first light detector 31, for example, subtracting the light receiving result in the second light detector 32 from the light receiving result in the first light detector 31, the intensities of the detection light beams reflected by the target object Ob1 located in the first space 10R1 can be derived, and by using the derivation result of the intensities, the position of the target object Ob1 located in the first space 10R1 can be derived. Further, the position of the target object Ob2 located in the second space 10R2 can be derived based on the light receiving result in the second light detector 32. Therefore, the positions of the target objects Ob1, Ob2 respectively located in the two spaces (the first space 10R1 and the second space 10R2) distant from each other in the emission direction of the detection light beams can be detected optically.

Further, in the present embodiment, the position derivation section 50 detects the position of the target object Ob1 located in the first space 10R1 based on the difference between the light receiving result in the first light detector 31 and the light receiving result in the second light detector 32, and according to this configuration, the correction corresponding to the light receiving result in the second light detector 32 can be performed on the light receiving result in the first light detector 31 by the simple process of obtaining the difference.

Further, since the transmissive member 16 for holding the second light detector 32 is disposed on the one side Z1 of the position detecting light source 12 and the first light detector 31 in the Z-axis direction, the second light detector 32 and the second reference light emitting element 12T can be held at positions distant from each other on the one side Z1 of the position detecting light source 12 and the first light detector 31 in the Z-axis direction. Further, the transmissive member 16 has an advantage that the presence thereof is inconspicuous. Further, in the present embodiment, the transmissive member 16 has a plate-like shape, and the first space 10R1 and the second space 10R2 are separated by the transmissive member 16. Therefore, the optical position detection device 10 to which the invention is applied can be used to optically detect the position of a customer (the target object Ob1) located inside (the first space 10R1) a store window and the position of a customer (the target object Ob2) located outside (the second space 10R2). Further, the optical position detection device 10 to which the invention is applied can be used to optically detect the position of a ball or a game medium (the target object Ob1) shaped like a coin moving inside (the first space 10R1) a cover glass (the transmissive member 16) in amusement equipment such as a pinball machine covered by the cover glass and the position of a player (the target object Ob2) located outside (the second space 10R2).

Further, in the present embodiment, the second light detector 32 and the second reference light emitting element 12T are disposed on the side of the first space 10R1 with respect to the transmissive member 16, and on the side of the first space 10R1 there are disposed the position detecting light source 12, the first light detector 31, and the first reference light emitting element 12S. Therefore, it is possible to dispose all of the position detecting light source 12, the first light detector 31, the first reference light emitting element 12S, the second light detector 32, and the second reference light emitting element 12T on the side of the first space 10R1, and therefore, there is no need to dispose any of the position detecting light source 12, the first light detector 31, the second light detector 32, and so on in the second space 10R2. Therefore, the configuration in the second space 10R2 can be simplified.

Further, since the position detecting light source 12 emits the infrared light beams as the detection light beams, there can be obtained an advantage that the detection light beams are inconspicuous. Further, since the position detecting light source 12 is provided with the plurality of light emitting elements 12A, 12B, and 12C formed of LEDs having the central optical axes located differently and for emitting the detection light beams L2 toward the one side Z1 in the Z-axis direction, the configuration of the position detecting light source 12 can be simplified.

Other Embodiments

Although in the embodiment described above the second light detector 32 and the second reference light emitting element 12T are disposed on the side of the first space 10R1 with respect to the transmissive member 16, it is also possible to adopt the configuration in which the second light detector 32 and the second reference light emitting element 12T are disposed on the side of the second space 10R2 with respect to the transmissive member 16.

Although in the embodiment described above, the position detecting light source 12 is provided with the three light emitting elements 12A, 12B, and 12C, it is also possible to adopt the configuration provided with two or more than three light emitting elements.

Although in the embodiment described above, the position detecting light source 12 is provided with the plurality of light emitting elements 12A, 12B, and 12C having the central optical axes located differently and for emitting the detection light beams L2 toward the one side Z1 in the Z-axis direction, it is also possible to use a sheet light source capable of sequentially forming the light intensity distribution used to detect the XY coordinate.

The entire disclosure of Japanese Patent Application No. 2010-052818, filed Mar. 10, 2010 is expressly incorporated by reference herein.

What is claimed is:

1. An optical position detection device adapted to optically detect a position of a target object, comprising:
   a position detecting light source adapted to emit at least one detection light beam toward one side in a Z-axis direction intersecting an X-axis direction and a Y-axis direction intersecting each other;
   a first light detector having a light receiving section directed to the one side in the Z-axis direction;
   a second light detector located at a position on the one side in the Z-axis direction, the position being distant from the position detecting light source and the first light detector, and having a light receiving section directed to the one side in the Z-axis direction; and a position derivation section adapted to derive a position of a target object located in a first space between the first light detector and the second light detector and a position of a target object located in a second space on the one side of the second light detector in the Z-axis direction based on a light receiving result in the first light detector and a light receiving result in the second light detector.

2. The optical position detection device according to claim 1, wherein
the position derivation section derives the position of the target object located in the second space based on the light receiving result in the second light detector, and detects the position of the target object located in the first space based on a difference between the light receiving result in the first light detector and the light receiving result in the second light detector.

3. The optical position detection device according to claim 1, wherein
the position derivation section derives a position in the X-axis direction and a position in the Y-axis direction as the position of the target object.

4. The optical position detection device according to claim 1, wherein
the position derivation section derives a position in the Z-axis direction as the position of the target object.

5. The optical position detection device according to claim 1, further comprising:
a transmissive member located on the one side of the position detecting light source and the first light detector in the Z-axis direction, and adapted to hold the second light detector.

6. The optical position detection device according to claim 5, wherein
the transmissive member has a plate-like shape, and
the first space and the second space are separated by the transmissive member.

7. The optical position detection device according to claim 6, wherein
the second light detector is disposed on a side of the first space with respect to the transmissive member.

8. The optical position detection device according to claim 1, wherein
the position detecting light source emits at least one infrared light beam as the detection light beam.

9. The optical position detection device according to claim 1, wherein
the position detecting light source has a plurality of light emitting elements having central optical axes located differently, and adapted to emit the respective detection light beams to the one side in the Z-axis direction.

* * * * *